United States Patent Office 2,863,283
Patented Dec. 9, 1958

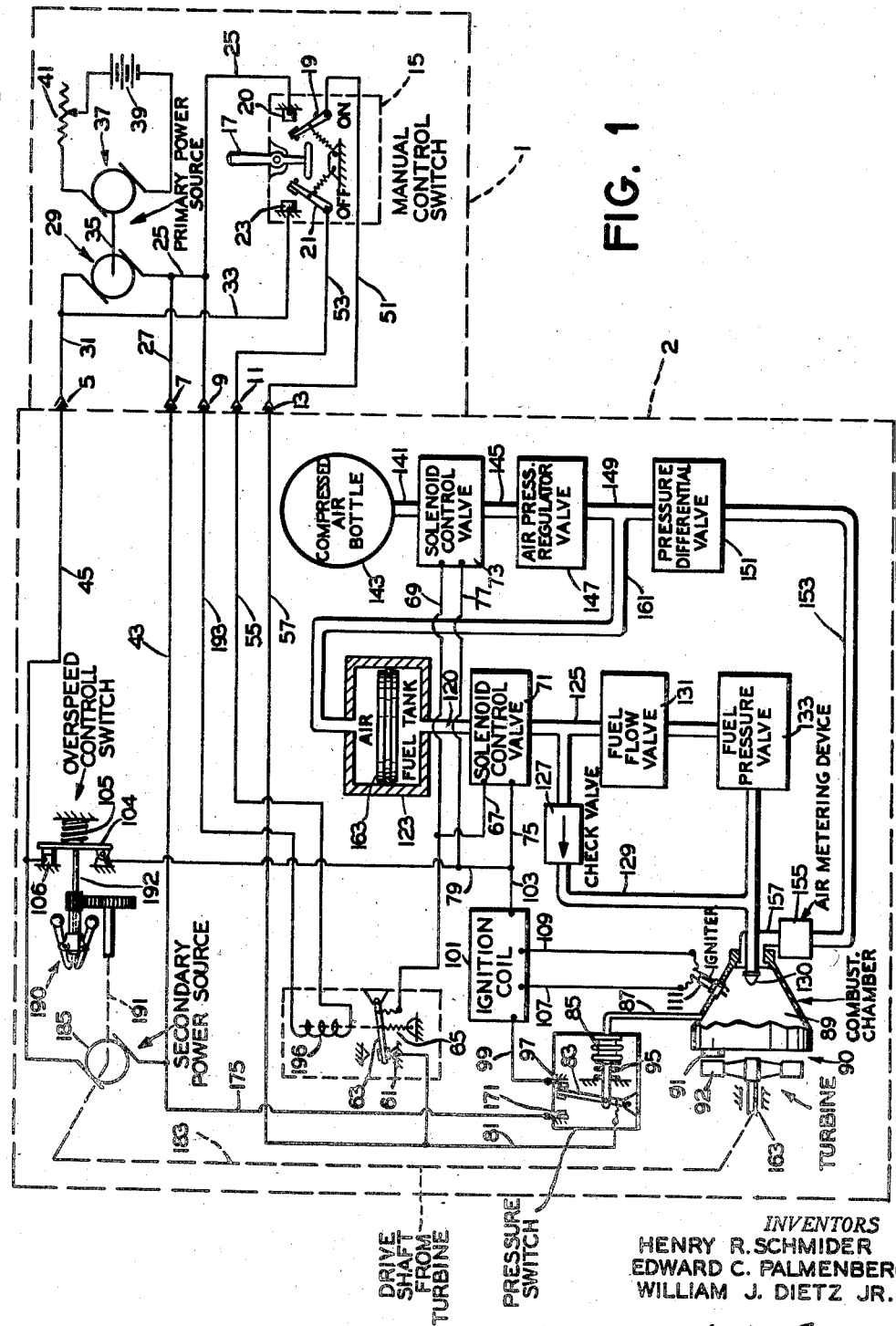

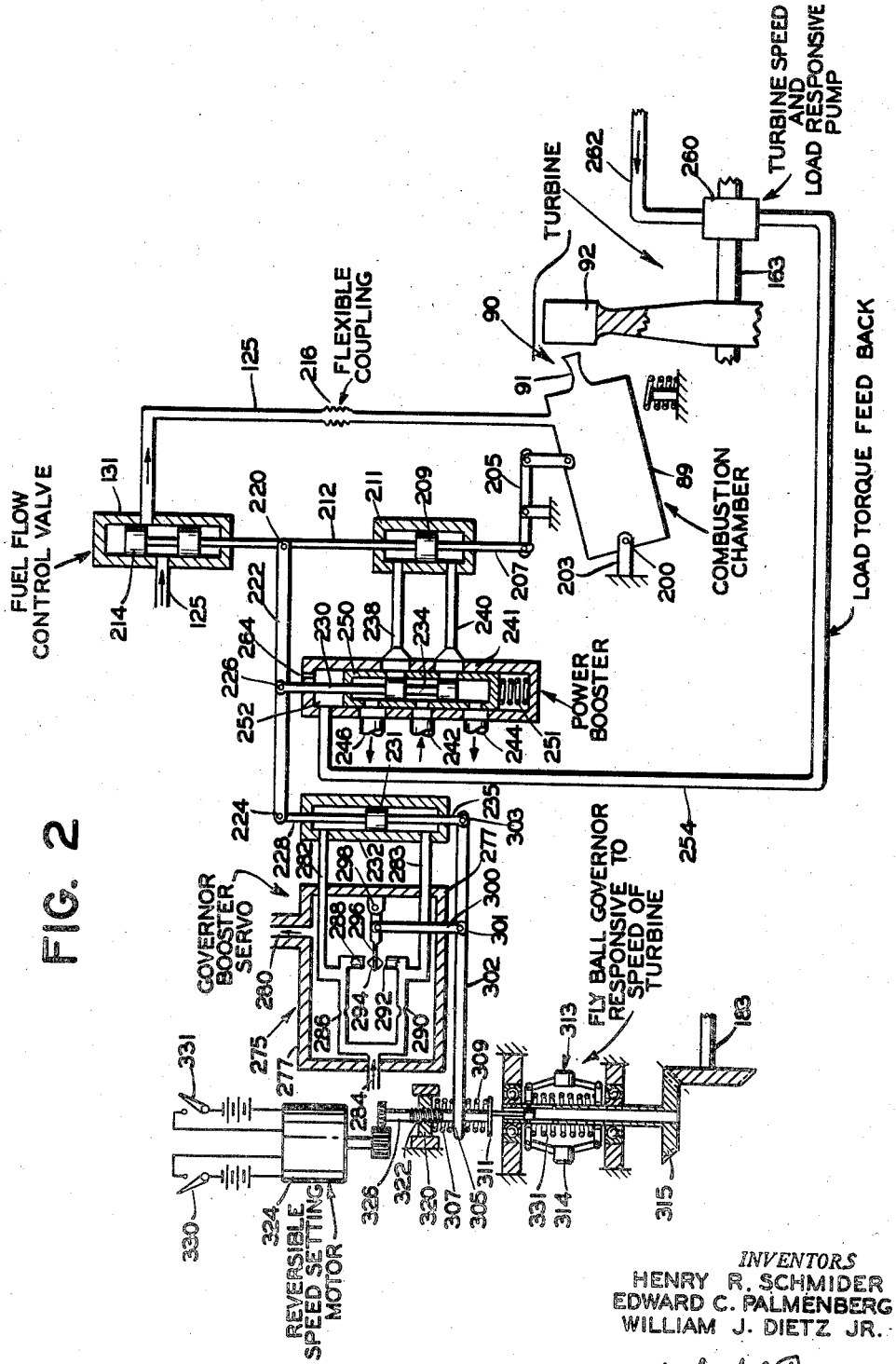

2,863,283

SPEED CONTROL SYSTEM FOR GAS TURBINE ENGINES

Henry R. Schmider, Clifton, N. J., Edward C. Palmenberg, Nanuet, N. Y., and William J. Dietz, Jr., Hillsdale, N. J., assignors to Bendix Aviation Corporation, Teterboro, N. J., a corporation of Delaware Application March 31, 1955, Serial No. 498,235

5 Claims. (Cl. 60—39.24)

The present application relates to a novel dual type control system and method for inducing combustion and controlling decomposition of monopropellant fuels such as propyl nitrate, ethylene oxide and hydrazine so as to produce impulses for operating gas driven devices for providing an auxiliary power supply for an aircraft or for driving an aircraft, guided missile or projectile and for controlling the flow of fuel to a combustion chamber and the impingement of the generated gases against a turbine after the initial starting operation thereof. Decomposition of such a fuel is initiated by the combination of an oxidizing agent and fuel in the presence of an igniter and after the initial starting operation has been effected, ignition of the fuel supplied the chamber continues through the action of the ignited fuel in the chamber.

Broadly the subject invention involves improvements in a fuel control system of a type such as disclosed and claimed in U. S. application Serial No. 249,532, filed October 3, 1951, by Emil A. Volk, Jr., and Walter D. Teague, Jr.; U. S. application Serial No. 328,988 now Patent No. 2,742,759 filed December 31, 1952, by Cameron D. Flanigen and William John Dietz, Jr.; U. S. application Serial No. 329,048 now Patent No. 2,742,758 filed December 31, 1952, by Jack J. Kelly; and application Serial No. 329,063 now Patent No. 2,742,757 filed December 31, 1952, by John S. Jaquith and which applications have been assigned to Bendix Aviation Corporation, the assignee of the present application.

An object of the invention is to provide a novel control system for regulating the speed of a combustion engine in a projectile or guided missile during flight of the aircraft.

Another object of the invention is to provide a novel control for regulating the driven speed of a prime mover by varying both the gas impingement on the prime mover and the quantity of fuel supplied the combustion chamber so as to effect a dual control efficiently regulating the speed of the prime mover.

Another object of the invention is to provide a novel control system for effecting fuel economy as well as providing for variation in gas impingement on the prime mover in regulating the driven speed of the prime mover.

Another object of the invention is to provide a method of regulating the driven speed of a turbine by controlling both the quantity of fuel supplied the combustion chamber and the location of the combustion chamber and exhaust outlet thereof relative to the turbine so as to effectively regulate the driven speed thereof.

The above and other objects and features of the invention will appear more fully hereinafter from a consideration of the following description taken in connection with the accompanying drawing wherein one embodiment of the invention is illustrated by way of example:

In the drawings:

Figure 1 is a schematic diagram illustrating a system for controlling the starting of an aircraft engine.

Figure 2 is a schematic diagram illustrating a system for controlling the speed of a turbine driven engine in flight of the aircraft.

Referring now to the drawing of Figure 1, there is indicated generally by the numeral 1, a primary power source and control therefor and by the numeral 2 there is schematically illustrated a secondary power source, control system and engine carried by a projectile or guided missile and which may be detached from the primary power source 1 through detachable connectors of suitable type indicated generally by the numerals 5, 7, 9, 11, and 13.

The primary power source and control 1 includes a control switch 15 having an operator-operative lever 17 manually operable in a counter-clockwise direction to cause switch element 19 to close contact 20. The switch element 19 is normally biased by a suitable spring to an open position. The lever 17 may be also operated in an opposite clockwise direction to cause switch element 21 to close contact 23. The switch element 21 is normally biased by a suitable spring to an open position.

The switch contact 20 is connected by a conductor 25 to an output conductor 27 of an A. C. generator 29, while another output conductor 31 of the generator 29 is connected by conductor 33 to the contact 23 of the control switch 15. The generator 29 is driven through shaft 35 by suitable power means, such as an electrical motor 37 energized by a suitable source of electrical energy indicated herein as battery 39 connected to the motor through a suitable rheostat 41. The output lines 27 and 31 of the generator 29 are in turn connected through the detachable connectors 7 and 5 to lines 43 and 45 respectively in the control system 2. The control switch elements 19 and 21 are in turn connected through conductors 51 and 53 through the detachable connectors 11 and 13 to conductors 55 and 57 in the control system 2. The conductor 57 is in turn connected to contact 61 controlled by switch element 63 biased into a contact closing position by spring element 65.

The switch element 63 is in turn connected by conductors 67 and 69 to solenoid controlled valves 71 and 73. The opposite terminal of the respective control solenoids for the valves 71 and 73 being connected by conductors 75 and 77 to a conductor 79 leading to the output conductor 45. Energization of the respective control solenoids in the valves 71 and 73 causes the opening of such valves while upon deenergization of the control solenoids the valves 71 and 73 assume a normal closed valve position.

The electrical conductor 57 is also connected through a conductor 81 to a switch arm 83 operated by a pressure bellows 85. The interior of the bellows 85 is connected through a conduit 87 to the interior of combustion chamber 89 of an engine 90. The combustion chamber 89 has a nozzle 91 for directing combustion gases so as to drive a turbine 92 of the engine 90, as hereinafter explained.

The pressure responsive bellows 85 is normally biased by spring 95 in a direction causing switch arm 83 to close contact 97 which contact is connected through a conductor 99 to one side of an ignition coil 101. The opposite input side of the ignition coil 101 is connected by conductor 103 to the conductor 79 leading to output conductor 45 through an overspeed control switch 104 biased by spring 105 to a position closing contact 106 so as to connect conductor 79 to conductor 45.

Conductors 107 and 109 lead from the output of the ignition coil 101 to a spark plug or other suitable igniter 111 projecting into the combustion chamber 89 for ignition of fuel supplied thereto, as hereinafter explained. It will be seen then that upon operation of the lever 17 of the switch 15 in a counter-clockwise direction so as to cause switch element 19 to close contact 20, the control valves 71 and 73 will be actuated to an open valve position, while the ignition coil 101 will be energized causing the igniter 111 to be excited to effect ignition of fuel supplied to the combustion chamber 89. Solenoid controlled valve 71 controls a conduit 120 leading from the fuel tank 123 to a supply conduit 125 which in turn is connected through a check valve 127 and conduit 129 to a fuel metering nozzle 130 projecting into the combustion chamber 89.

The conduit 125 is also connected to the fuel nozzle 130 through a suitable fuel flow valve 131 and fuel pressure valve 133. After combustion in the chamber 89 has been initiated, the speed of the engine 90 may be regulated through operation of suitable mechanism responsive to the driven speed of the engine 90 controlling the fuel flow control valve 131 and the adjusted position of the nozzle 91 relative to turbine 92, as shown in Figure 2 and explained hereinafter. The valve 133 has a higher fuel pressure setting than check valve 127 and is unaffected by the combustion pressure from chamber 89. The valve 133 is so arranged as to remain closed until the fuel pressure in line 125 has exceeded the pressure setting of the valve 133 causing the valve 133 to open.

The valve 73 controls the conduit 141 leading from the compressed air bottle 143 so that upon energization of the solenoid controlling the valve 73, the valve 73 opens the conduit 141 to the conduit 145 leading through an air pressure regulator valve 147 of a suitable type to an air conduit 149 which in turn leads through a pressure differential valve 151, conduit 153, and air metering device 155, of a suitable type, and conduit 157 into the combustion chamber 89. The air is thus directed about the fuel metering nozzle 130 so as to effect ignition and combustion of fuel supplied the combustion chamber through nozzle 130.

Air under high pressure from the compressed air bottle 143 is also directed by air conduit 161 leading from the conduit 149 to one side of fuel tank 123 so as to cause a suitable piston 163 to be pressurized so as to force a starting surge of fuel from the opposite side of the fuel tank 123 through conduit 120, solenoid controlled valve 71, conduit 125, check valve 127 and conduit 129 into the combustion chamber 89 through the fuel metering nozzle 130. Similarly temporary flow of starting air is supplied to the decomposition chamber 89 through the conduit 153 and the air metering device 155.

Combustion of the fuel and air mixture in the combustion chamber 89 is initiated by the igniter 111 which is simultaneously excited upon energization of the solenoids controlling the valves 71 and 73 by the closing of switch element 19 through operation of the manually operable control lever 17. Upon combustion in the chamber 89, the rise in the chamber pressure causes the pressure responsive bellows 85 to actuate the switch arm 83 in a counter-clockwise direction to close a contact 171 and in turn connect conductor 81 to the output conductor 43 through a conductor 175.

Upon combustion in the chamber 89, the rise in chamber pressure closes the pressure differential valve 151 and the fuel check valve 127 thereby halting the flows of starting air and starting fuel. The main fuel supply to the combustion chamber 89 is then fed through the fuel flow control valve 131 under control of an engine speed responsive mechanism shown in Figure 2 and hereinafter explained.

The turbine 92 driven by combustion gases applied through nozzle 91 in turn drives shaft 163 for driving a second shaft 183 and a generator 185 which provides a secondary power source. The output of generator 185 is also connected across the lines 45 and 43 heretofore described.

Upon the engine of the projectile or guided missile being driven at sufficient speed to cause the projectile or guided missile to detach itself from the primary source 1, the secondary power source or generator 185 becomes the sole source of supply of electrical energy for the projectile.

A conventional fly-ball speed governor 190 driven from shaft 183 by a shaft 191 is arranged to operate, through a pin 192, the switch 104 so as to open the conductor 79 and shut the system down under excessive emergency speed conditions.

Further, the closing of the switch contact 171 by the switch arm 83 will cause, upon a detachment of the projectile from the primary source 1, the secondary source 2 to maintain energization of the respective control valves 71 and 73 so as to permit the supply of fuel and air to the combustion chamber 89 of the engine 90 which may provide an auxiliary source of power for control purposes to be used in a guided missile or projectile or such engine could be used as the primary source of power to carry the projectile or guided missile to its destination. After initiation of the starting operation, the engine is controlled by the speed control mechanism, shown in Figure 2, and hereinafter described and explained.

Should it be desired after initiating operation of the control system to shut the same down before the projectile has detached itself from the primary power source, this may be readily effected by pushing the switch arm 17 in a clockwise direction so as to cause switch element 21 to close contact 23. The latter action causes energization of electromagnet 196 connected across conductor 55 and conductor 193 leading to the conductor 25.

Energization of the electromagnetic winding 196 will thereupon actuate the switch 63 to an open position against the biasing force of the spring 65 causing in turn the deenergization of the respective solenoids controlling the valves 71 and 73 and deenergization of ignition coil 101.

When the unit is thus shut down, fuel flow to the combustion chamber 89 and the pressurizing air to the fuel tank 123 is shut off by the respective solenoid controlled valves 71 and 73. A portion of the air trapped in the line 161 at the air side of the fuel tank 123 is bled off through the pressure differential valve 151 and conduit 153 so as to purge the combustion chamber 89 of any residual combustion products. The use of the pressure differential valve 151 instead of a conventional check valve effects a saving of compressed air for restarting since a major portion of the compressed air will remain in the compressed air side of the tank 123.

*Operation of the starting control system*

In view of the foregoing, it will be seen that upon operation of the starting switch lever 17 so as to close switch element 19 electrical power is supplied through normally closed contacts 83—97 of a pressure switch controlled by bellows 85 (which senses decomposition chamber 89 pressure) to the spark plug 111 and through normally closed relay contacts 61—63 to the air and fuel solenoid controlled valves 71 and 73. As decomposition is initiated, the chamber 89 pressure rises to a value which causes bellows 85 to open the normally closed contacts 83—97 of the pressure switch and stops the action of the spark plug 111. Further with the latter action, the rising decomposition pressure in chamber 89 also causes bellows 85 to actuate the arm 83 so as to close contact 171 which connects the control solenoids of valves 71 and 73 to the power lines 43—45 and in parallel to the power lines 27—31 of the primary power source 1 of the mother aircraft or other launching means for the projectile or missile 2. Thus the valves 71 and 73 are connected to the power lines 43—45 carried by the missile 2 for later disconnection through disconnectors 5, 7, 9, 11 and 13 from the electrical system of the mother aircraft or launching means and energization solely by generator 185 carried by the projectile or missile 2. In the event the generator 185 is driven by turbine 92 in excess of a predetermined safe value, overspeed governor 190 is provided to actuate the overspeed switch 104 so that the electrical line 79 feeding the solenoids controlling the air and fuel control valves 71 and 73 is broken causing the valves 71 and 73 to be actuated to a closed position.

In order to shut the system off during normal operation prior to flight of the missile or projectile 2, the control lever 17 may be thrown in a clockwise direction by the operator to an "off" position so as to cause switch element 21 to close contact 23 energizing relay winding 196 causing switch arm 63 to open contact 61 and interrupting the supply of electrical energy to the solenoids controlling the fuel and air control valves 71 and 73 whereupon the valves 71 and 73 are actuated to a closed position.

Energization of the solenoids controlling the fuel and air control valves 71 and 73 by closing switch element 19 pressurizes the fuel system and opens the starting fuel valve 71 to the decomposition chamber 89 while high pressure air from the supply tank 143 pressurizes the piston type fuel flask 123 and causes piston 163 to force from the flask 123 a starting charge of fuel through a check valve 127 and metering nozzle 130 into the decomposition chamber 89. Simultaneously, temporary flow of starting air is supplied to the decomposition chamber 89 through a pressure differential valve 151 and metering device 155.

Combustion of the fuel and air mixture in the decomposition chamber 89 is initiated by a conventional ignition spark from the spark plug 111. Upon combustion, the rise in pressure in chamber 89 closes the pressure differential valve 151 and the fuel check valve 127, thereby halting the flows of starting air and starting fuel. The main fuel supply to the combustion chamber 89 is then controlled through valves 133 and 131 in which its flow is regulated through valve 131 by the turbine speed control mechanism of Figure 2.

When the unit is shut down by the closing of switch element 21, fuel flow into the decomposition chamber 89 and pressurizing air to the fuel flask 123 is shut off by the closing of valves 71 and 73. The air trapped in the conduits 161 and 149 leading to the fuel flask 123 is bled off through the pressure differential valve so as to purge the decomposition chamber 89.

Features of the starter control system herein before described are disclosed and claimed in a copending application Serial No. 498,391 filed March 31, 1955, by Henry R. Schmider, Edward C. Palmerberg and William J. Dietz, Jr.

*Speed control mechanism*

The speed control mechanism is shown in detail in Figure 2 and is designed for use with the mechanism of Figure 1 wherein like numerals indicate corresponding parts. Referring then to Figure 2, the combustion chamber 89 is shown schematically as pivotally supported at 200 by a bracket 203 and adjustably positioned through a linkage 205, rod 207 and piston 209 slidably mounted in a chamber 211. The rod 207 affixed to the piston 209 projects from one end of the chamber 211 while a second rod 212 affixed to the piston 209 projects from the opposite end of the chamber 211.

The rod 212 is in turn affixed to a valve element 214 slidably mounted in the fuel flow control valve 131 and controlling the flow of fuel through the conduit 125 which is connected to the combustion chamber 89 through a flexible coupling 216 so as to permit adjustment of the combustion chamber 89 and the nozzle 91 relative to the turbine 92 by the piston 209.

Pivotally connected at 220 to the piston rod 212 is a beam 222 which is pivotally connected in turn at 224 and 226 to rods 228 and 230. The rod 228 is adjustably positioned by a piston 231 slidably mounted in the piston chamber 232. The piston rod 228 is affixed to one side of the piston 231 and projects from one end of the chamber 232, while a second rod 235 is affixed to the other side of the piston 231 and projects from an opposite end of the chamber 232.

The piston 231 may thereby adjustably position through beam 222 the rod 230 which is in turn affixed to a servo valve 234 controlling selectively the conduits 238 and 240 leading from the servo valve chamber 241 and thereby the application of servo fluid pressure applied through conduit 242 to piston 209 and the drainage of servo fluid from one side or the other of the piston 209 in the chamber 211 through the drainage conduits 244 and 246.

The valve 230 is slidably mounted in a valve sleeve 250 which is in turn slidably mounted in the valve chamber 241. A spring 251 biases the valve sleeve 250 upwardly and cooperates with the servo valve 234 to control the conduits 238 and 240. A variable fluid pressure is applied to a chamber 252 at the upper end of the valve sleeve 250 and acts in opposition to the biasing force of the spring 251.

The chamber 252 is connected by conduit 254 to the outlet of a suitable hydraulic pump 260 having a fluid inlet conduit 262. The pump 260 is driven by the shaft 163 of the turbine 92 so as to supply through conduit 254 oil or other suitable hydraulic medium to the chamber 252 under a fluid pressure proportional to the driven speed of the turbine 92.

A bleed passage 264 in the chamber 252 permits the fluid medium supplied chamber 252 to bleed therefrom. Thus upon an increase in the speed of the turbine 92 the hydraulic fluid pressure supplied the chamber 252 and acting upon the valve sleeve 250 tends to move the valve sleeve 250 downward against the biasing force of spring 251. However, upon a decrease in the speed of the turbine 92 there is effected a decrease in such pressure and the spring 251 tends to bias the sleeve 250 in an upward direction against the decreasing biasing force of the hydraulic fluid medium in the chamber 252.

It will be seen from the foregoing that adjustment of the control piston 231 in an upward direction will cause the corresponding upward adjustment of valve 234 so as to effect an application of a servo fluid pressure medium to the piston 209 through the line 238 and drainage of the fluid medium at the underside of the piston 209 through the passage 240 and conduit 244.

Such upward adjustment of the valve 234 will in turn cause an adjustment of the piston 209 in a downward direction tending to actuate the combustion chamber 89 and nozzle 91 in a counter-clockwise direction decreasing the speed of the turbine 92. Such downward adjustment of the piston 209 will also simultaneously cause an adjustment of the fuel flow control valve 214 in a downward direction tending to decrease the supply of fuel through line 125 to the combustion chamber 89 so as to act in a sense to decrease the driven speed of the turbine 92.

Further, such a decrease in the speed of the turbine 92 will cause a decrease in the fluid pressure applied to the chamber 252 tending to cause the valve sleeve 250 under force of the spring 251 to move upwardly so as to provide a follow-up action tending to follow the adjustment of the valve 234, heretofore described, so as to tend to terminate the supply of hydraulic fluid applied through the channel 238 to the piston 209.

Adjustment of the control piston 231 in an opposite downward sense will cause an opposite adjustment of the valve 234, combustion chamber 89 and fuel control valve 214 to increase the speed of the turbine 92.

Controlling the operation of the piston 231 is a governor booster servo mechanism indicated generally by the numeral 275 and including a casing 277 and drainage passage 280, together with fluid pressure control lines 282 and 283 leading to opposite sides of the piston 231. The fluid pressure control line 282 is supplied with fluid medium by a pressure line 284 leading through a restriction 286 to the line 282 and which line 282 has in turn a controlled valve opening 288.

Similarly, the line 283 is supplied with fluid pressure medium from the line 284 through a restriction 290 and which line 283 has in turn a controlled valve opening 292.

As shown in Figure 2, the controlled valve openings 288 and 292 are arranged in opposite relation and are arranged to be alternately opened and closed by valve element 294 mounted on arm 296 pivotally mounted within the casing 277 at a point 298.

Operatively positioning the valve 294 relative to the valve openings 288 and 292 is a linkage arm 300 pivotally connected exteriorly of the casing at a point 301 to an actuator arm 302. The linkage 300 is operatively connected to the arm 302 at a point intermediate the opposite ends thereof. One end of the arm 302 is pivotally connected at 303 to a rod 235 of the piston 231.

The opposite end 305 of the arm 302 is resiliently supported at 305 by spring elements 307 and 309 bearing on the arm 305 at the opposite sides thereof. The spring 309 is supported by an element 311 which is adjustably positioned through operation of a fly-ball governor 313 having weighted elements 314 of conventional type and driven through gearing 315 by shaft 183 from the turbine driven shaft 163.

The spring 307 at the other side of the end 305 of lever 302 has an end supported by an element 320 which may be adjustably positioned by an actuating screw 322 in turn driven by servomotor 324 through shaft 326. The servomotor 324 may be controlled manually by the operator by suitable switch elements 330—331 or by a suitable control circuit not shown and arranged to adjust the speed setting of the fly-ball governor 313 to a desired value.

From the foregoing it will be seen that upon the speed of the turbine increasing beyond the value for which the spring 307 is set, weights 314 will be thrown outwardly by centrifugal force so as to pull the element 311 downwardly causing the arm 302 to be adjusted in a counter-clockwise direction so as to in turn close the valve opening 292 and open the valve opening 288, so that greater fluid pressure may be applied through passage 283 causing an upward adjustment of the piston 231. Such action will in turn cause the piston 209 to adjust the fuel valve 214 and the combustion chamber 89 in a sense to decrease the speed of the turbine 92 to the regulated value.

Of course, upon the speed of the turbine 92 decreasing below that for which the spring 307 is set, the weights 314 of the fly-ball governor 313 will move inwardly under force of a spring 331 so as to in turn cause the lever 302 to be moved in a clockwise direction, causing the adjustment of the valve 294 to close valve opening 288 and open valve opening 292, and in turn moving the piston 231 in a downward direction to effect an increase of the speed of the turbine 92 back to the desired value.

It should also be noted that such adjustment of the arm 302 by the speed governor 313 will cause the piston 231 to actuate through the piston rod 235 the arm 302 in a sense to follow up the adjustment of the valve 294 and effect a return adjustment thereof to a neutral position. Such follow-up action of the piston 231 on the lever 302 will tend to prevent over-adjustment or hunting in the control 275 and provide stability of control.

*Operation of the turbine speed control mechanism*

From the foregoing it will be seen that the position of piston 209 and rod 212 of the control of Figure 2 is determined by the speed governor 313 so that if an increase in speed is called for by the governor 313, the arm 222 pivots in a counter-clockwise direction about point 220 and if a decrease in the speed of the turbine 92 is called for, the arm 222 is pivoted about point 220 in a clockwise direction, as shown schematically in Figure 2. This motion of the arm 222 adjusts the position of the servo valve 234 which selectively feeds servo fluid to either side of the servo piston 209, depending upon whether or not an increase or decrease in the speed of the turbine 92 is required. Further, the piston 209 is connected by rod 212 to the fuel metering valve 214 and determines the position thereof and hence the amount of fuel flowing to the combustion or decomposition chamber 89. Rod 207 is also connected to the piston 209 so that simultaneously with the adjustment of fuel valve 214 the position of the combustion chamber 89 and exhaust gas nozzle 91 are also adjustably positioned relative to the turbine 92 through linkage 205. In this way the speed of the prime mover or turbine 92 is controlled both by the adjusted position of the fuel metering control valve 214 and by the adjusted position of the decomposition chamber 89 relative to the turbine 92.

This method of control of the quantity of fuel and location of the decomposition chamber results in a finer control than might otherwise have been achieved. Additionally, there is a considerable fuel saving from this dual control during speeds of low output power.

Although only one embodiment of the invention has been illustrated, various changes can be made in the design and arrangement of the parts without departing from the spirit and scope of the invention as the same will now be understood by those skilled in the art.

What is claimed is:

1. The combination comprising a turbine, a combustion chamber having an exhaust gas nozzle, said combustion chamber and said gas nozzle being adjustable relative to said turbine to vary the driven speed thereof, an adjustable valve means to vary the supply of fuel to said combustion chamber, motor means for simultaneously adjusting said exhaust gas nozzle and valve means to vary the speed of said turbine first means responsive to a condition of operation related to power output of said turbine operatively connected to said motor means for controlling said motor means in accordance with variations from a preselected value of said condition of operation, and second means responsive to said condition of operation related to power output operatively connected to said motor means, said second means being operative to terminate the effect of said first means on said motor means when said preselected value is attained.

2. The combination comprising a turbine, a combustion chamber having an exhaust gas nozzle, said combustion chamber and said gas nozzle being adjustable relative to said turbine to vary the driven speed thereof, an adjustable valve means to vary the supply of fuel to said combustion chamber, motor means for simultaneously adjusting said exhaust gas nozzle and valve means to vary the speed of said turbine, servo-valve means for controlling said motor means, turbine speed responsive means, said servo valve means including a first control element operatively connected to said turbine speed responsive means to regulate the driven speed of said turbine to a preselected value, another turbine speed responsive means, said servo-valve means including a second control element operatively connected to said other turbine speed responsive means to effect control of said servo-valve means to a null position.

3. In an internal combustion engine, the combination comprising a combustion chamber having an exhaust gas nozzle, a turbine driven by exhaust gases from said nozzle, a fluid fuel inlet conduit to said combustion chamber, valve means to control said fuel conduit, servo-motor means including a piston having an actuating rod operatively connected to said valve means, means pivotally mounting said combustion chamber for adjustment of said chamber and exhaust gas nozzle relative to said turbine to vary the impingement of exhaust gases on said turbine, said motor means having another actuating rod operatively connecting said piston to said combustion chamber for the adjustment thereof, and turbine speed responsive means for controlling said piston so as to regulate the speed of the turbine.

4. In an internal combustion engine, the combination comprising a combustion chamber having an exhaust gas nozzle, a turbine driven by exhaust gases from said nozzle, a fluid fuel inlet conduit to said combustion chamber, valve means to control said fuel conduit, servomotor means including a piston having an actuating rod operatively connected to said valve means, means pivotally mounting said combustion chamber for adjustment of said chamber and exhaust gas nozzle relative to said turbine to vary the impingement of exhaust gases on said turbine, said motor means having another actuating rod operatively connecting said piston to said combustion chamber for the adjustment thereof, servo valve means including a first adjustable control element and a second adjustable control element, said first and second control elements cooperating in controlling the adjusted position of said piston, first speed responsive means for adjusting said first control element upon a change in the driven speed of said turbine from a selected value, and a second speed responsive means for adjusting said second control element upon change in said turbine speed in response to the adjustment of said first control element.

5. The combination comprising a turbine, a combustion chamber having an exhaust gas nozzle adjustable relative to said turbine to vary the driven speed thereof, an adjustable valve means to vary the supply of fuel to said combustion chamber, engine operating condition responsive means for simultaneously adjusting both said valve means and said exhaust gas nozzle so as to maintain a predetermined engine operating condition, said engine operating condition responsive means including an engine speed responsive means to effect simultaneous adjustment of both said valve means and exhaust gas nozzle so as to regulate the engine speed to a preselected value, and means for sensing the turbine output load, said means being operable to cause a modification in said preselected engine speed value according to increasing or decreasing load conditions.

References Cited in the file of this patent
UNITED STATES PATENTS

| | | |
|---|---|---|
| 2,219,994 | Jung | Oct. 29, 1940 |
| 2,500,537 | Goddard | Mar. 14, 1950 |
| 2,609,661 | Nardone | Sept. 9, 1952 |
| 2,625,789 | Starkey | Jan. 20, 1953 |
| 2,651,492 | Feilden | Sept. 8, 1953 |
| 2,672,726 | Wolf et al. | Mar. 23, 1954 |
| 2,695,494 | Gray | Nov. 30, 1954 |
| 2,715,814 | Barr | Aug. 23, 1955 |
| 2,735,499 | Ehlers | Feb. 21, 1956 |